No. 787,154.

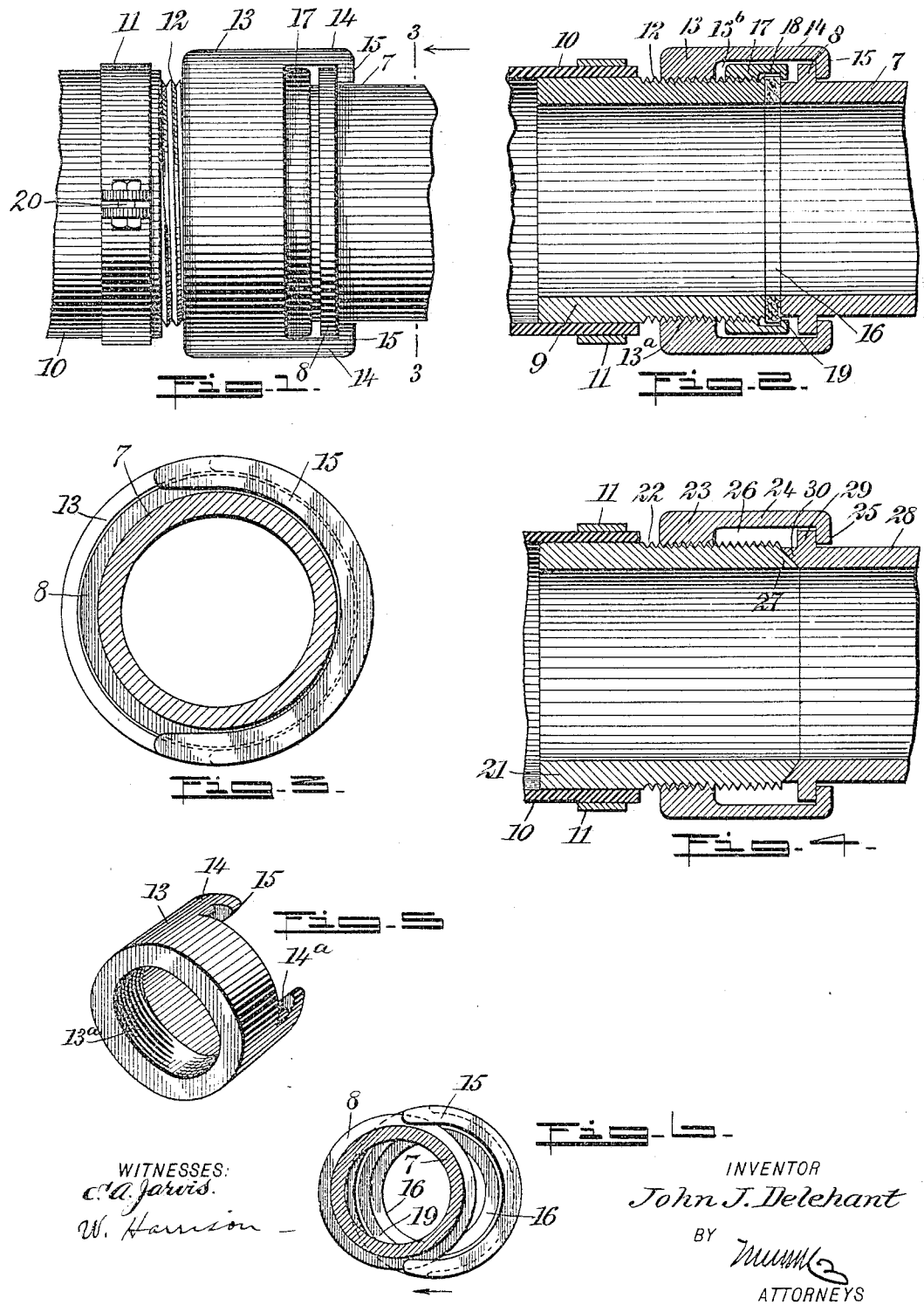

Patented April 11, 1905.

UNITED STATES PATENT OFFICE.

JOHN J. DELEHANT, OF CHICAGO, ILLINOIS.

HYDRAULIC COUPLING.

SPECIFICATION forming part of Letters Patent No. 787,154, dated April 11, 1905.

Application filed May 2, 1904. Serial No. 205,902.

*To all whom it may concern:*

Be it known that I, JOHN J. DELEHANT, a citizen of the United States, and a resident of Chicago, in the county of Cook and State of Illinois, have invented a new and Improved Hydraulic Coupling, of which the following is a full, clear, and exact description.

My invention relates to hydraulic couplings, and more particularly to a type of coupling suitable for fastening hose to hydrants, for coupling hose-sections together, and for general service where a pipe or tube of any kind is to be quickly coupled with a member through which water is to flow.

Reference is to be had to the accompanying drawings, forming a part of this specification, in which similar characters of reference indicate corresponding parts in all the figures.

Figure 1 is a perspective view showing my coupling in use upon a hydrant-spout. Fig. 2 is a vertical longitudinal section through the same. Fig. 3 is a vertical cross-section upon the line 3 3 of Fig. 1 looking in the direction of the arrow. Fig. 4 is a vertical longitudinal section through another form of coupling. Fig. 5 is a perspective view of one of the coupling-sections, and Fig. 6 is a cross-section showing the two coupling members being moved into position for securing the same together.

Referring to Figs. 1 and 2, the hydrant-spout is shown at 7 and is provided externally with an annular bead 8. The hose 10 is provided with a member 9, which I designate as a "tenant coupling-section" and which is secured upon the hose by pressure of the band 11, this band being clamped by means of a tightening device 20, which may be of the usual construction. The tenant coupling-section 9 is provided with a thread 12, and movably mounted upon this thread is a coupling-head 13, provided with a comparatively thin portion 14 and with a cupped edge 15, as shown in Fig. 5. A washer 16, which may be of leather or of any desired material, is encircled by a washer-holder 17 of annular conformity and threaded internally, as shown. This washer-holder is provided with an annular channel 18, which is so cut as to leave a cupped edge 19. The washer 16 is sprung into place so as to be gripped by the cupped edge 19, and thus held in engagement with the tenant coupling-section 9. By turning the washer-holder 17 the washer may be tightened or loosened, as desired, and is thus rendered removable as well as adjustable. The washer-holder 17 occupies an annular space 13$^b$ in the coupling-head, which is provided internally with a thread 13$^a$, mating that of the thread 12. The cupped edge 15 of the coupling-head is of substantially semicircular form, as shown in Figs. 3, 5, and 6, thus leaving a slot or mutilation 14$^a$, into which the annular bead 8 may be slipped laterally, as indicated in Fig. 6.

My invention is used as follows: Suppose it be desired to secure the hose 10 upon the hydrant-spout 7. Ordinarily the hose would be provided with a coupling-section having a thread and the hydrant-spout would also be provided with a thread, so that it would be necessary for the operator to first apply the coupling-section to the hydrant-spout and then turn the section until the thread is caught. This is not always easy to accomplish, for the reason that the thread may be damaged or filled with dirt and the operator may be nervous, as is often the case during a time of excitement. With my apparatus, however, the operator merely grasps the coupling-head 13 and slips the same laterally over the annular bead 8 of the hydrant-spout 7. The coupling-head 13 is next turned so as to force the section 9, carrying the washer 16, toward the hydrant-spout, thus securing an air-tight joint by pressure upon this washer. One or two turns of the coupling-head will nearly always accomplish this result. The washer-holder 17 need not be adjusted very often, for the reason that its adjustment is independent of the coupling of the section 9 upon the hydrant-spout 7.

The form shown in Fig. 4 is preferably used for either connecting two hose-sections together or for connecting a hose-section upon a hydrant-spout. The respective sections to be connected are shown at 21 and 28, the latter being provided with an annular portion 29. The hose 10 is provided with a band 11, as above described, and the section 21 is provided with a thread 22. The coupling-head 23 is provided with a comparatively thin portion 24 and with a cupped edge 25, these parts being substantially the same as the coupling-head 13, provided with the portions 14 and 15. An annular space 26 is formed within the coupling-head 23 and encircled by the thin portion 24 thereof. The respective contact edges 27 30 of the sections 21 and 28 are beveled, as shown, and are preferably ground for the purpose of insuring an air-tight joint. By merely turning the coupling-head 23 the cupped edge 25 being in engagement with the annular portion 29 of the section 28 forces the sections 21 and 28 rigidly together. Where either form is used, only a moment is required to make the connection. It will be understood, of course, that the sections 7 9 are reversible, as is the case with the sections 28 21, so that either part may be connected with the hydrant-spout or with a hose-section.

It will be noted that the thread 12 or 22 is in permanent engagement with all the threads mating it, so that there is no occasion for losing time in "catching the thread."

Having thus described my invention, I claim as new and desire to secure by Letters Patent—

1. In a hydraulic coupling, the combination of a coupling-section provided with a thread, a washer mounted upon the end of said coupling-section, a washer-holder provided with a thread engaging said thread of said coupling member and provided with a portion for engaging said washer, a coupling-head provided with a thread engaging said thread of said coupling-section, and also provided with a cupped edge and with a mutilation bound by said cupped edge, the general direction of said mutilation being lateral to the axis of said coupling-section, and another coupling member provided with an annular bead for engaging said mutilation, and further provided with a portion for engaging said washer.

2. In a hydraulic coupling, the combination of a coupling-section provided with a thread, a collar provided with a thread mating the same and with a portion for clamping a washer against the coupling-section, and a coupling-head provided with a thread mounted upon said coupling-section, said coupling-head being provided with a portion for engaging another coupling-section.

In testimony whereof I have signed my name to this specification in the presence of two subscribing witnesses.

JOHN J. DELEHANT.

Witnesses:
GEO. W. TISCHART,
E. J. DE GRASSE.